(No Model.)
H. S. OWEN.
BICYCLE.
No. 392,523. Patented Nov. 6, 1888.
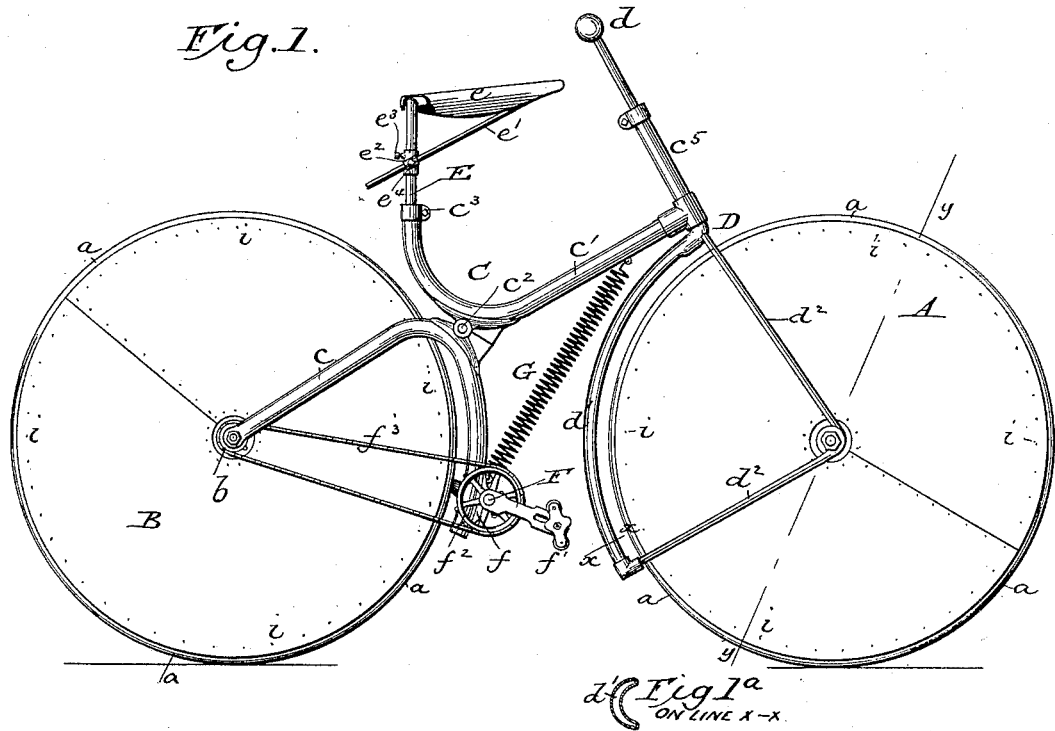
Attest:
Sidney P. Hollingsworth
W. R. Kennedy.
Inventor:
H. S. Owen,
By his Atty.
Phil. T. Dodge

UNITED STATES PATENT OFFICE.

HERBERT S. OWEN, OF WASHINGTON, DISTRICT OF COLUMBIA.

BICYCLE.

SPECIFICATION forming part of Letters Patent No. 392,523, dated November 6, 1888.

Application filed February 16, 1888. Serial No. 264,199. (No model.)

*To all whom it may concern:*

Be it known that I, HERBERT S. OWEN, of Washington, in the District of Columbia, have invented certain Improvements in Bicycles, of which the following is a specification.

My invention relates, mainly, to improvements in the construction of the frame and the seat or saddle. As the improvements are principally intended for use in what are known at the present day as "safety-bicycles," I have in the drawings shown them incorporated in a machine of this character; but it is to be understood that they are also applicable to machines of other types.

Figure 1 represents a side elevation of a bicycle constructed on my plan. Fig. 1$^a$ is a cross-section on line $x\ x$, Fig. 1, of the guard.

Referring to Fig. 1, A represents a front steering-wheel; B, a rear driving-wheel; C, the main frame or reach, forked at its rear end to embrace and carry the rear-wheel axle, as usual; and D, the front fork or steering-head, carrying at its lower end the axle of the front wheel, and mounted at its upper end to swivel in the front of the main frame, and provided, as usual, with a steering bar or handle.

The frame C, instead of being made, as usual, in a rigid piece from end to end, is divided midway of its length, or thereabout, its rear portion, $c$, and its forward portion, $c'$, being connected by a hinge-joint, $c^2$, having a horizontal axis, so that the frame may receive a vertical flexion. In the form represented the forward member, $c'$, is made of tubular form and continued rearward and upward beyond the joint, terminating in a tubular portion adapted to receive the saddle post or standard E, which will be confined adjustably in place by means of the usual compression-clip, $c^3$, or equivalent fastening.

The rear member, $c$, bifurcated at its rear end to admit the wheel, is made of tubular form at its forward end and continued downward beyond the joint to receive the bearings $f$, which support the transverse crank-shaft F, lying between the two wheels. A spring, G, is connected at one end to the forward member, $c'$, and at its opposite end to the lower extremity of the rear member, $c$, as shown in Fig. 1, so that it tends to support the middle portion of the frame and hold it, together with the seat, in its greatest elevation.

The shaft F, located directly beneath the saddle and at a suitable distance therefrom, as usual, is provided at its ends with the customary crank-pedals, $f'$, and is also provided with a sprocket-wheel, $f^2$, connected by a sprocket-chain, $f^3$, to a sprocket-wheel, $b$, fixed on the hub or axle of the rear wheel, B. By this arrangement of parts, which is now common in the art, motion is communicated from the pedal-shaft to the rear wheel for the purpose of propelling the machine.

The steering bar or handle $d$ is located in advance of the saddle and within reach of the rider in the usual manner.

The front or steering fork, D, may be of ordinary form and construction; but I strongly recommend the peculiar construction represented in the drawings, in which it will be perceived that the body portion of the fork is made of tubular form. The upper end is left straight to pass through and form a journal within the tubular socket $c^5$; but below the socket the tube is flattened or given a crescent form in cross-section, as shown in Fig. 1$^a$, and is so curved as to follow closely around the periphery of the wheel over a quarter of its circumference, or thereabout, as seen at $d'$, whereby it is adapted to serve the purpose of a mud-guard or splasher, and also to sustain the arms $d^2$, which carry the axle. There are two of these arms, one on each side of the wheel. Each arm consists of a rolled or drawn steel rod bent midway of its length to a right angle and attached at one extremity to the upper end of the portion $d'$ and at its lower extremity to the lower end of the portion $d'$, as shown. At the junction of the arms $d^2$ they are either coiled to receive the ends of the axle, as shown in the drawings, or provided with bearing-plates to receive the axle, as preferred.

The saddle consists of the usual post or standard, E, having the cantle rigidly secured to its upper end. The cantle is in turn secured to the rear end of the flexible seat or saddle proper, $e$. The forward end or pommel of the saddle is attached to and supported by the forward end of a rod, $e'$, which passes downward and rearward through a clip, $e^2$, on the standard. The clip is vertically adjustable upon and is secured to the standard by a bolt, $e^3$, and is in turn secured to the rod by a bolt, $e^4$. The last-named bolt admits of the rod being adjusted lengthwise in order to raise and lower the pommel, while the vertical adjustment of the standard E allows the entire saddle to be raised and lowered bodily.

It will be perceived that under my construction the flexion of the frame permits the saddle to rise and fall, but that the distance between the saddle and the pedal remains practically unchangeable.

Having thus described my invention, what I claim is—

1. In a bicycle main frame, the member $c$, forked to receive the rear wheel and curved downward at its forward end, the forward member, $c'$, having its front end adapted to receive the steering-fork and its rear end carried upward to sustain the seat, the hinge connecting said parts, and the intermediate spring.

2. The steering-fork consisting of the tubular member $d$, having its upper end fashioned into a journal and its lower end flattened and curved to follow the circumference of the wheel, in combination with the two pairs of L-shaped arms $d^2$, substantially as shown.

3. In a steering-fork, a portion, $d'$, curved to follow the circumference of the wheel, in combination with two pairs of angular arms, $d^2$, secured at their ends thereto and arranged to admit the wheel and axle between them, as shown.

4. In a bicycle or tricycle, the seat post or standard, in combination with the flexible sheet attached to its top and the brace extending from the standard to the opposite end of the sheet.

5. In combination with the standard E, the flexible sheet or seat proper secured thereto, the vertically-adjustable clamp on the standard, and the brace secured to the sheet and adjustably connected to the clamp.

In testimony whereof I hereunto set my hand this 21st day of January, 1888, in the presence of two attesting witnesses.

HERBERT S. OWEN.

Witnesses:
FREDK. D. OWEN,
P. T. DODGE.